United States Patent
Hashimoto et al.

(10) Patent No.: US 11,178,081 B2
(45) Date of Patent: Nov. 16, 2021

(54) MANAGEMENT DEVICE, MANAGEMENT METHOD, AND MANAGEMENT PROGRAM

(71) Applicant: NIPPON TELEGRAPH AND TELEPHONE CORPORATION, Tokyo (JP)

(72) Inventors: Junko Hashimoto, Musashino (JP); Naoko Kosaka, Musashino (JP); Tsuneko Kura, Musashino (JP); Koji Kishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/056,421

(22) PCT Filed: Jun. 4, 2019

(86) PCT No.: PCT/JP2019/022232
§ 371 (c)(1),
(2) Date: Nov. 18, 2020

(87) PCT Pub. No.: WO2019/235495
PCT Pub. Date: Dec. 12, 2019

(65) Prior Publication Data
US 2021/0211394 A1    Jul. 8, 2021

(30) Foreign Application Priority Data
Jun. 4, 2018    (JP) .............................. JP2018-107256

(51) Int. Cl.
*H04L 12/58* (2006.01)

(52) U.S. Cl.
CPC .................................. *H04L 51/046* (2013.01)

(58) Field of Classification Search
CPC ....................................................... H04L 51/046
USPC .......................................................... 709/206
See application file for complete search history.

(56) References Cited

U.S. PATENT DOCUMENTS

| 2011/0035681 | A1* | 2/2011 | Mandel | .................. H04L 51/16 715/752 |
| 2015/0331865 | A1* | 11/2015 | Bank | ................. G06F 16/24578 707/723 |
| 2017/0323086 | A1* | 11/2017 | Lopez-Uricoechea | ...................... H04L 63/104 |
| 2018/0183619 | A1* | 6/2018 | Jayaram | .................. H04L 51/16 |

FOREIGN PATENT DOCUMENTS

JP    2004-240726 A    8/2004

* cited by examiner

*Primary Examiner* — James E Springer
(74) *Attorney, Agent, or Firm* — Xsensus LLP

(57) ABSTRACT

A server (10) that manages a plurality of boards refers to, when a similarity between a message Ax of a board A and a message Bx of a board B is equal to or greater than a prescribed value, information disclosable range information of each board, and when it is determined that boards capable of disclosing a message of the board B includes the board A, discloses the message Bx on the board A. In addition, when the server (10) refers to the information disclosable range information of each board and determines that the boards capable of disclosing a message of the board A includes the board B, discloses the message Ax on the board B.

5 Claims, 10 Drawing Sheets

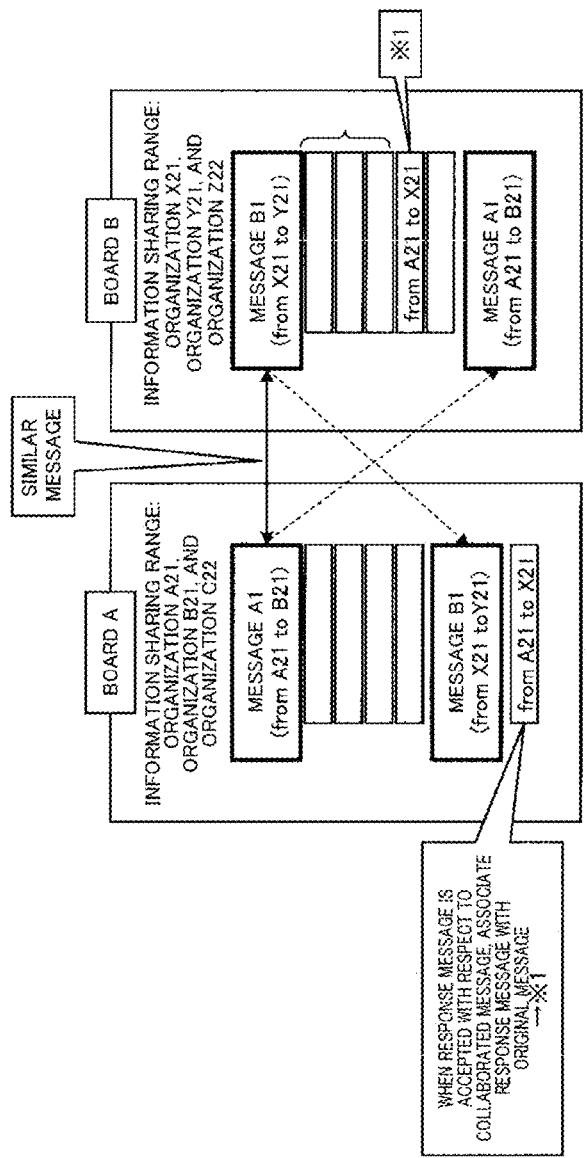

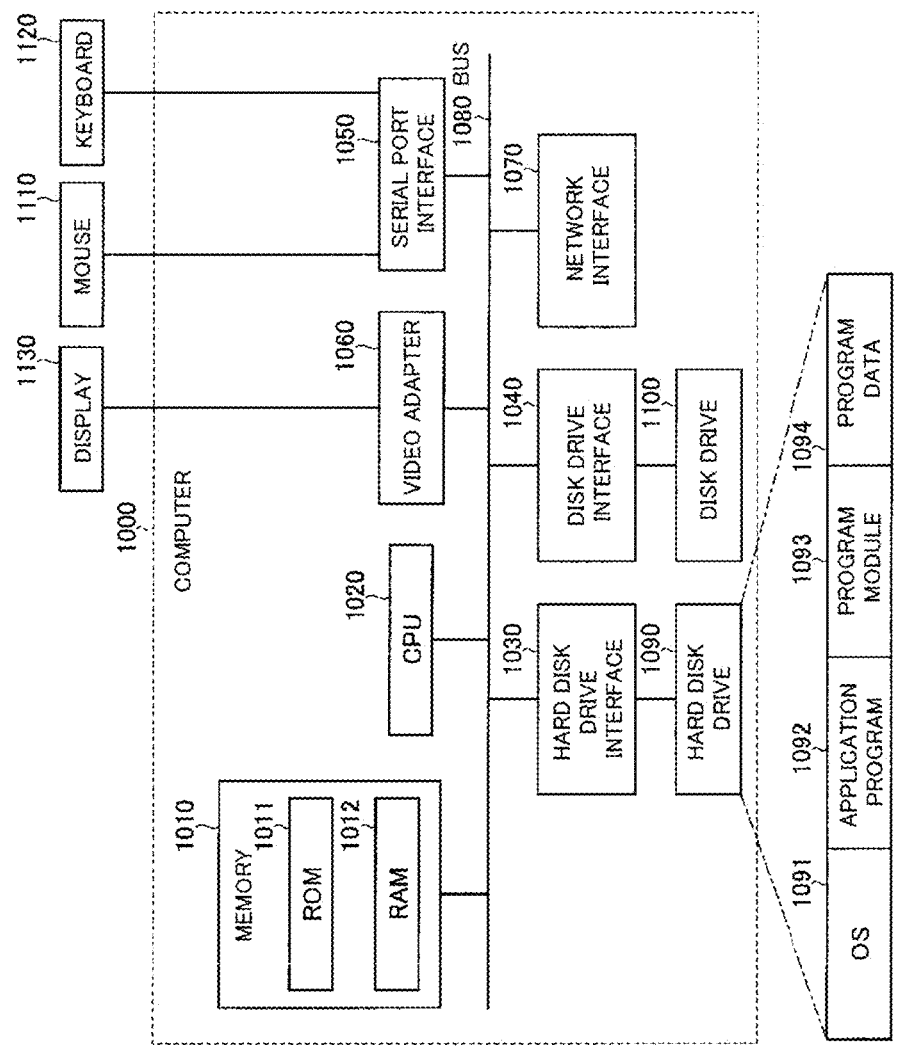

MANAGEMENT DEVICE, MANAGEMENT METHOD, AND MANAGEMENT PROGRAM

CROSS-REFERENCE TO RELATED APPLICATIONS

The present application is based on PCT filing PCT/JP2019/022232, filed Jun. 4, 2019, which claims priority to JP 2018-107256, filed Jun. 4, 2018, the entire contents of each are incorporated herein by reference.

TECHNICAL FIELD

The present invention relates to a management device, a management method, and a management program.

BACKGROUND ART

Message boards (boards) are widely used as information sharing tools and, according to the boards, members can be set for each board and information can be shared among the members. In addition, techniques that realize information exchange, collaborative work, and the like within a same community by simple operations are being proposed (refer to PTL 1).

CITATION LIST

Patent Literature

[PTL 1] Japanese Patent Application Laid-open No. 2004-240726

SUMMARY OF THE INVENTION

Technical Problem

However, conventionally-provided techniques do not enable information to be shared between members (organizations) of different boards or a range across which information is shared by a board to be expanded. Therefore, information cannot be shared between organizations using boards in an efficient manner. In consideration thereof, an object of the present invention is to solve the problem described above and perform information sharing between organizations using boards in an efficient manner.

Means for Solving the Problem

In order to solve the problem described above, the present invention is a management device which manages a plurality of boards and which enables a message of the boards to be shared by organizations in an information sharing range of the boards, the management device including: a collaboration processing unit which, when a similarity between a first message that belongs to a first board and a second message that belongs to a second board is equal to or greater than a prescribed value, refers to information disclosable range information of the first board that indicates a board or an organization in a range where a message of the first board is disclosable beyond an information sharing range of the first board and discloses the first message on the second board when it is determined that the second board is included in the range where the first message is disclosable, and when the information disclosable range information of the first board is referred to and a determination is made that an organization to which an issuer of the second message belongs is included in the range where the first message is disclosable, discloses the first message to the organization to which the issuer of the second message of the second board belongs.

Effects of the Invention

According to the present invention, information can be shared between organizations using boards in an efficient manner.

BRIEF DESCRIPTION OF DRAWINGS

FIG. 8 is a diagram showing an example of screen display in a case where a server according to another embodiment accepts a response message with respect to a collaborated message.

FIG. 9 is a diagram showing an example of a computer that executes a management program.

DESCRIPTION OF EMBODIMENTS

Hereinafter, embodiments of the present invention including first to fifth embodiments will be separately described with reference to the drawings. It is to be understood that the present invention is not limited to the embodiments.

First Embodiment

[Outline]

First, with reference to FIG. 1A, an outline of a collaboration of a message that straddles different boards by a server (a management device) according to First embodiment will be described. A server 10 manages a board that includes a plurality of messages. The board is a board that is used by organizations (members) engaging in crisis response operations in order to share information. A message on the board is, for example, a message related to a crisis response operation.

Figure 1A:
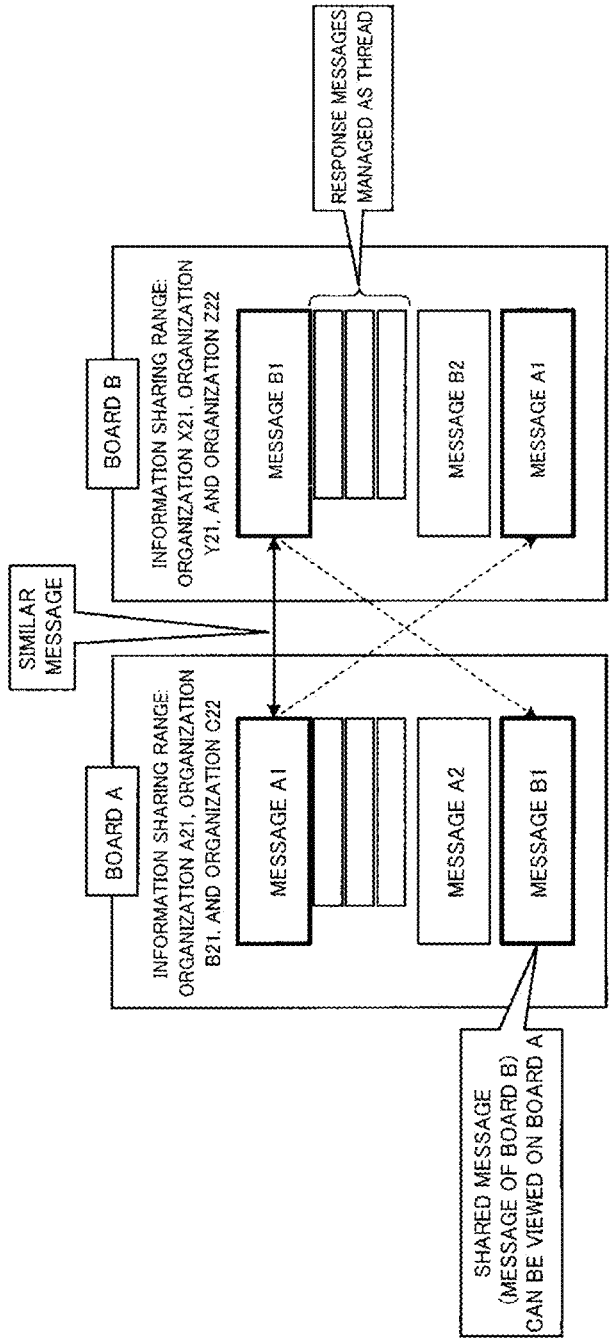
FIG. 1A is a diagram for illustrating a collaboration of a message by a server (a management device) according to First embodiment.

For example, in FIG. 1A, a board A includes messages A1 and A2 and a board B includes messages B1 and B2. In addition, as shown in FIG. 1A, a response message with respect to a message on a board is associated on the board and managed as, for example, a thread on the board.

With respect to a board, a range (an information sharing range) of the board in which information is shared (a message is shared) is defined. For example, in FIG. 1A, an information sharing range of the board A is defined as organizations A21, B21, and C22 and an information sharing range of the board B is defined as organizations X21, Y21, and Z22. Therefore, posting and viewing of messages to the board A are limited to the organizations A21, B21, and C22 and posting and viewing of messages to the board B are limited to the organizations X21, Y21, and Z22.

In addition, although not illustrated in FIG. 1A, with respect to a board, a range in which a message of the board is disclosable (an information disclosable range) is defined. For example, when the board A is included in an information disclosable range of the board B shown in FIG. 1A, a message of the board B can also be disclosed on the board A. The information disclosable range may be defined by boards (disclosable on which boards) as described above or may be defined by organizations (disclosable to which organizations).

In a system including such boards, when there are similar messages A1 and B1 between different boards A and B, the server performs a collaboration of messages so as to straddle the boards.

For example, let us consider a case where the message A1 of the board A and the message B1 of the board B are similar to one another and the board A is included in the information disclosable range of the board B. In this case, the server also discloses the message B1 on the board A. Accordingly, a user of the board A can view a shared message (a message of the board B) on the board A.

In addition, when the board B is included in the information disclosable range of the board A, the server also discloses the message A1 on the board B. Accordingly, a user of the board B can view the shared message A1 (a message of the board A) on the board B.

Accordingly, a user of a board (a member of an organization in the information sharing range of the board) can view, on the user's own board, another board that is similar to a message having been posted on the user's own board. In addition, a message on another board that is similar to a message having been posted on the user's own board can be enabled to be viewed by a member of the other board. As a result, information can be shared between organizations using boards in an efficient manner.

Figure 1B:
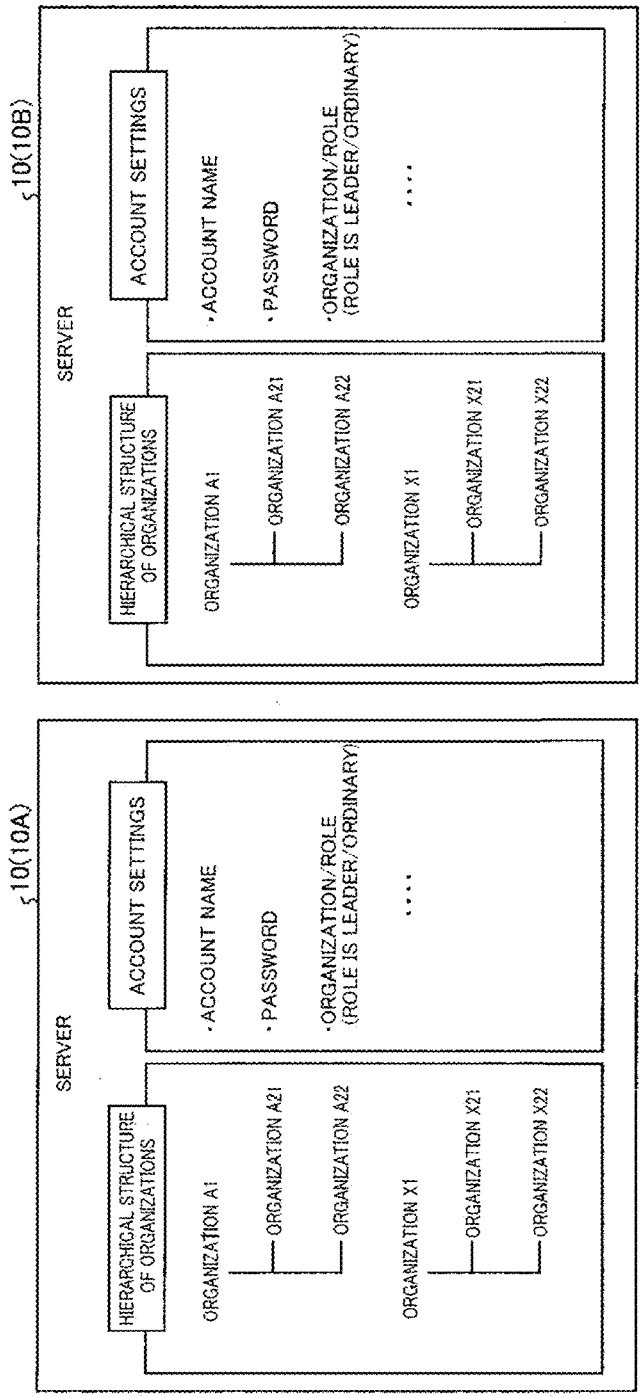
FIG. 1B is a diagram showing an example of a hierarchical structure of organizations and account settings that are managed by the server according to First embodiment.

It should be noted that, in the following description, the server 10 that manages boards manages settings of a hierarchical structure and accounts of organizations that use the boards (for example, an account name, a password, an organization to which a user of the account name belongs, and a role (for example, a leader or ordinary) played by the user of the account name) as shown in FIG. 1B. In addition, based on settings of the hierarchical structure and the accounts of organizations that use the boards, the server 10 causes messages to be registered to the boards and viewed by the organizations that use the boards.

In addition, in a case where different servers 10 (for example, servers 10A and 10B) manage boards, when a same organization name is used by the respective servers 10, the organization name is to be identified by adding an ID number or the like of the servers 10.

[Configuration]

Figure 2:
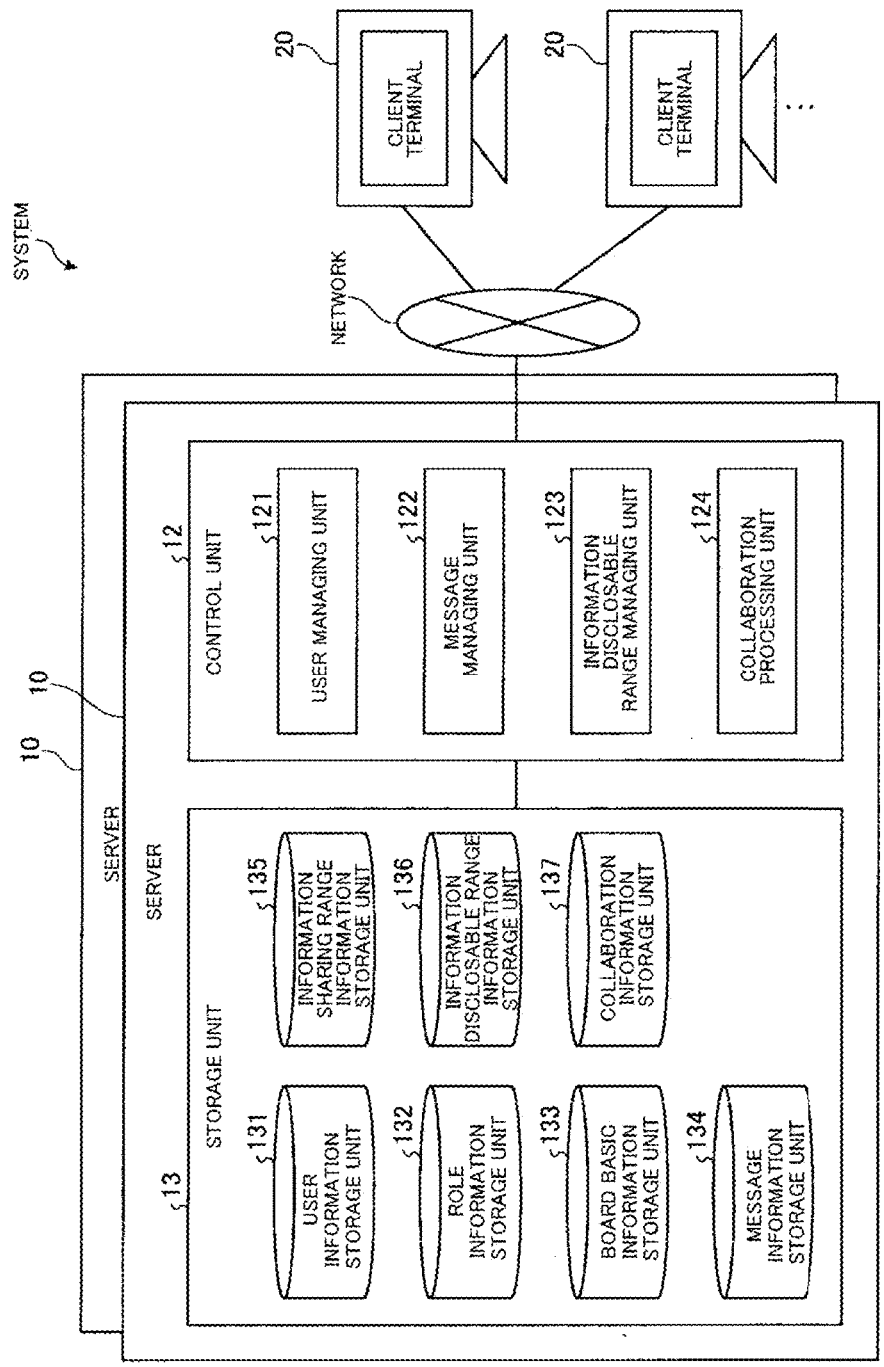
FIG. 2 is a diagram showing a configuration example of a system including the server according to First embodiment.

Next, with reference to FIG. 2, a configuration example of a system including the server 10 according to the present embodiment will be described. For example, as shown in FIG. 2, the system includes one or more servers 10 and one or more client terminals 20.

The server 10 and the client terminal 20 are connected to each other via a network such as the Internet. The server 10 manages the boards described above and, for example, upon receiving a message intended for a certain board from the client terminal 20 of an organization that uses the board, the server 10 registers the message to the destination board. In addition, the server 10 enables the client terminal 20 of the organization that uses the board to view messages on the board.

Next, a configuration of the server 10 will be described in detail. The server 10 includes a control unit 12 and a storage unit 13.

The control unit 12 is responsible for controlling the entire server 10 and includes, for example, a user managing unit 121, a message managing unit 122, an information disclosable range managing unit 123, and a collaboration processing unit 124.

The user managing unit 121 manages information (user information) on a user of a board. For example, upon accepting input of information such as a hierarchical structure of organizations of users of the board, an organization to which a user belongs, and a role (for example, a leader or ordinary) played by the user in the organization, the user managing unit 121 stores the information as user information in a user information storage unit 131. In addition, in the message collaboration described earlier, the user managing unit 121 refers to user information and collates a user.

The message managing unit 122 manages messages on each board. For example, the message managing unit 122 associates a message intended for a board with identification information of the destination board and stores the associated message in a message information storage unit 134. In addition, upon accepting input of information such as an administrator of a board (a board administrator) and a disclosure/nondisclosure mode of messages in the board, the message managing unit 122 stores the information as basic information of the board in a board basic information storage unit 133. Furthermore, upon accepting input of information sharing range information of a board, the message managing unit 122 stores the information sharing range information of the board in an information sharing range information storage unit 135.

The information disclosable range managing unit 123 manages information disclosable range information of each board. For example, upon accepting input of information indicating an information disclosable range of a board (information disclosable range information), the information disclosable range managing unit 123 stores the information disclosable range information in an information disclosable range information storage unit 136. In addition, upon accepting input of update information of information disclosable range information (for example, information to the effect that a new board or a new organization is to be added to the information disclosable range), the information disclosable range managing unit 123 updates the information disclosable range information in the information disclosable range information storage unit 136 based on the update information.

The collaboration processing unit 124 extracts similar messages between different boards and performs a collaboration that straddles the boards with respect to the extracted messages.

For example, the collaboration processing unit 124 extracts, from messages on different boards that are stored in the message information storage unit 134, a message group (for example, a message Ax on the board A and a message Bx on the board B) of which a similarity exceeds a prescribed threshold. In addition, when the collaboration processing unit 124 refers to information disclosable range information of each board and determines that the extracted message group can be collaborated so as to straddle the boards, the collaboration processing unit 124 stores information (collaboration information) to the effect that the extracted message group is to be collaborated in a collaboration information storage unit 137.

For example, when the collaboration processing unit 124 refers to information disclosable range information related to the board A and determines that the board B is included in an information disclosable range of the board A to which the message Ax belongs, the collaboration processing unit 124 stores collaboration information to the effect that the message Ax of the board A is to be disclosed (collaborated) on the board B in the collaboration information storage unit 137.

In addition, for example, when the collaboration processing unit 124 refers to information disclosable range information related to the board B and determines that the board A is included in an information disclosable range of the board B to which the message Bx belongs, the collaboration processing unit 124 stores collaboration information to the effect that the message Bx of the board B is to be disclosed (collaborated) on the board A in the collaboration information storage unit 137.

Furthermore, when the collaboration processing unit 124 refers to information disclosable range information of the respective boards and determines that a message cannot be collaborated on any of the boards, for example, the collaboration processing unit requests an administrator of the board determined to be incapable of collaboration to update the information disclosable range information related to the board. Subsequently, when the information disclosable range information of the board is updated, the collaboration processing unit 124 performs collaboration of the message using the updated information disclosable range information related to the board.

The storage unit 13 stores various pieces of information related to the management of messages of the boards. For example, the storage unit 13 includes the user information storage unit 131, a role information storage unit 132, the board basic information storage unit 133, the message information storage unit 134, the information sharing range information storage unit 135, the information disclosable range information storage unit 136, and the collaboration information storage unit 137.

The user information storage unit 131 stores user information. For example, the user information storage unit 131 includes a user information table (information indicating a user ID, an account name, a password, an organization ID, and a role ID of a user of a board) and an organization information table (information indicating an organization ID, an organization name, and a higher-level organization ID of an organization).

The role information storage unit 132 stores role information indicating a role (for example, a leader or ordinary) in an organization. For example, the role information storage unit 132 includes a role information table (information indicating a role ID and a role name).

The board basic information storage unit 133 stores basic information related to a board. For example, the board basic information storage unit 133 includes a board information table (information indicating a board ID, a board name, a disclosure mode, and an encryption flag) of a board.

The message information storage unit 134 stores messages on each board. For example, the message information storage unit 134 includes a message information table (information indicating a message ID, a board ID, a subject line, contents, an issue date/time, a transmission source organization ID, a transmission source user ID, a transmission destination organization ID list, and a transmission source user ID list of a message).

The information sharing range information storage unit 135 stores information sharing range information of each board. For example, the information sharing range information storage unit 135 includes an information sharing range information table (information indicating a board ID and an information sharing destination organization ID list of a board).

The information disclosable range information storage unit 136 stores information disclosable range information of each board. For example, the information disclosable range information storage unit 136 includes an information disclosable range information table (information indicating a board ID and a disclosure destination list of a board). For example, the disclosure destination list includes information such as a disclosure destination board ID, a disclosure destination organization ID, or a disclosure destination system ID.

The collaboration information storage unit 137 stores information (collaboration information) of a message that has been collaborated so as to straddle boards. In addition, for example, the information disclosable range information storage unit 136 stores a collaboration information table (information indicating a collaboration source message ID, a collaboration source board ID, a collaboration destination message ID, a collaboration destination board ID, a collaboration destination system ID, collaboration feasibility, and an update date/time of a message that has been collaborated so as to straddle boards).

It should be noted that, although a description has been omitted herein, as a basic function of the server 10, the server 10 is equipped with a function to enable an organization (the client terminal 20 of the organization) indicated in information sharing range information to view messages of each board that is stored in the message information storage unit 134. In addition, the server 10 refers to collaboration information that is stored in the collaboration information storage unit 137 and discloses (shares) a message that is a collaboration object so as to straddle boards.

[Processing Procedures]

Next, an example of processing procedures of the server 10 will be described using FIG. 3. Hereinafter, a case where messages that are a collaboration objects are the message Ax (hereinafter, abbreviated as Ax when appropriate) of the board A and the message Bx (hereinafter, abbreviated as Bx when appropriate) of the board B will be described as an example.

First, when the message managing unit 122 of the server 10 sets a board through input of basic information and the like of the board (S1) and subsequently accepts a message transmission or a message response intended for the board from the client terminal 20 (S2), processing of S3 and thereafter is performed.

Specifically, the collaboration processing unit 124 performs an extraction of a message that is an object of a collaboration that straddles boards (S3). For example, the collaboration processing unit 124 extracts messages Ax and Bx which respectively belong to different boards and of which a similarity exceeds a prescribed threshold from the message information storage unit 134.

For example, a timing of the extraction of the collaboration object message may be a timing at which the server 10 receives a new message to a board or, when the message information storage unit 134 is checked at prescribed intervals, a timing at which it is confirmed that a new message has been stored in the message information storage unit 134. Alternatively, when a collaboration object message extraction command is prepared, the timing of the extraction may be a timing at which the collaboration object message extraction command is input to the server 10 by a board administrator of a prescribed board. Details of the extraction of a collaboration object message at this point will be provided later.

After S3, the collaboration processing unit 124 refers to the information disclosable range information of the board A and determines whether or not Bx is included in a board of an information disclosable range b1 of Ax (S4). For example, the collaboration processing unit 124 refers to the information disclosable range information of the board A and determines whether or not the board B is included in the information disclosable range b1 of the board A. In this case, when the collaboration processing unit 124 determines that Bx is included in a board of the information disclosable range b1 of Ax (Yes in S4), the collaboration processing unit 124 creates collaboration information to the effect that Ax is to be shared on the board B of Bx and stores the collaboration information in the collaboration information storage unit 137 (S5: share Ax on board of Bx). Subsequently, the collaboration processing unit 124 advances to S7.

On the other hand, when the collaboration processing unit 124 determines that Bx is not included in a board of the information disclosable range b1 of Ax (No in S4), the collaboration processing unit 124 does not share Ax on the board of Bx (S6). Subsequently, the collaboration processing unit 124 advances to S7.

In S7, the collaboration processing unit 124 refers to the information disclosable range information of the board B and determines whether or not Ax is included in a board of an information disclosable range b2 of Bx. For example, the collaboration processing unit 124 refers to the information disclosable range information of the board B and determines whether or not the board A is included in the information disclosable range b2 of the board B. In this case, when the collaboration processing unit 124 determines that Ax is included in a board of the information disclosable range b2 of Bx (Yes in S7), the collaboration processing unit 124 creates collaboration information to the effect that Bx is to be shared on the board A of Ax and stores the collaboration information in the collaboration information storage unit 137 (S8: share Bx on board of Ax).

On the other hand, when the collaboration processing unit 124 determines that Ax is not included in a board of the information disclosable range b2 of Bx (No in S7), the collaboration processing unit 124 does not share Bx on the board of Ax (S9).

Subsequently, the server 10 refers to collaboration information that is stored in the collaboration information storage unit 137 and discloses (shares) messages that are collaboration objects (for example, the messages Ax and Bx) so as to straddle boards.

Figure 3:
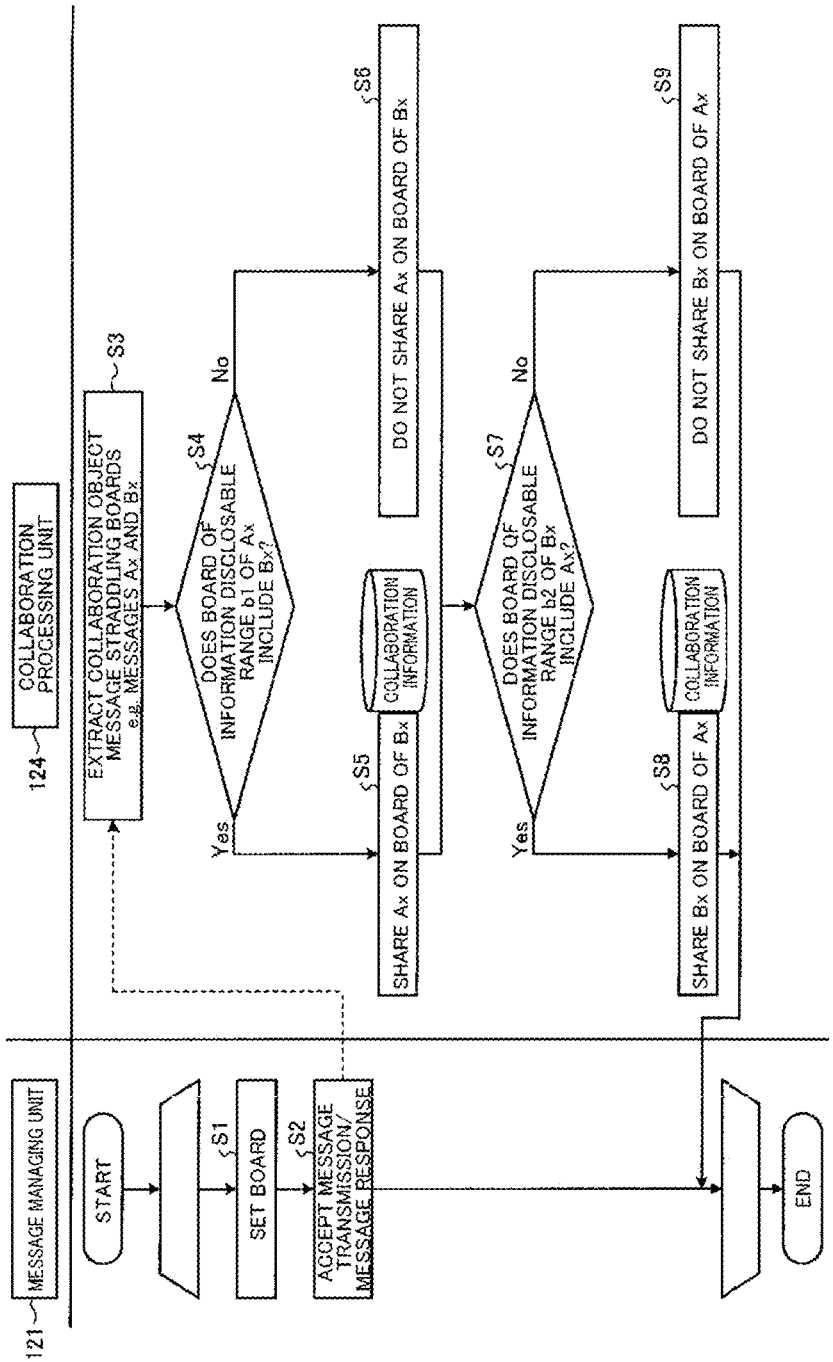
FIG. 3 is a sequence diagram showing an example of processing procedures of the server according to First embodiment.

For example, extraction processing of the collaboration object message in S3 shown in FIG. 3 is performed as follows.

For example, the collaboration processing unit 124 performs a morphological analysis of contents of the message Ax and, using nouns, verbs, and the like included in the message Ax as search keywords, searches contents of messages that are stored in the message information storage unit 134. In this case, the collaboration processing unit 124 assesses messages such that the larger the number of search keywords included in a message among the messages stored in the message information storage unit 134, the higher the similarity, and selects a group of messages of which the similarity exceeds a prescribed threshold as similar messages of the message Ax.

For example, let nouns and verbs included in the message Ax be expressed as Wax={Wax1, ..., Waxn$_{ax}$} and nouns and verbs included in a message By be expressed as Wby={Wby1, ..., Wbym$_{by}$}. In this case, a similarity (g(Ax, By)) between the message Ax and the message By can be obtained by Equation (1) below. In Equation (1), it is assumed that, when Waxi ∈Wby, f(Waxi, By)=1.

[Formula 1]

$$g(Ax, By) = \sum_{i=1}^{n_{ax}} f(Waxi, By) \quad \text{Equation (1)}$$

In this case, with respect to messages B1, ..., Bk stored in the message information storage unit 134, By ∈{B1, ..., Bk} of which g(Ax, By) described above exceeds a prescribed threshold is extracted as a collaboration object message (the message Bx described earlier) of the message Ax.

Accordingly, the server 10 can perform collaboration processing of similar messages (for example, the messages Ax and Bx) so as to straddle boards.

Second Embodiment

Next, Second embodiment of the present invention will be described. Same components as First embodiment will be denoted using same reference signs and descriptions thereof will be omitted.

When a board (for example, the board B) that is a collaboration destination does not belong to the information disclosable range of a board (for example, the board A) to which a message belongs in collaboration processing of the message, the server 10 according to Second embodiment requests an administrator of the board (for example, the board A) to expand the information disclosable range of the board (for example, the board A). For example, the server 10 sends a request for permission to include the board B in the information disclosable range of the board A to the administrator of the board A. In addition, when the administrator of the board (for example, the board A) permits expansion of the information disclosable range (inclusion of the board B in the information disclosable range) of the board (for example, the board A), the server 10 expands the information disclosable range of the board (for example, the board A). For example, the server 10 includes the board B in the information disclosable range of the board A.

Accordingly, even when a board that is a collaboration destination does not belong to the information disclosable range of a board to which a message belongs in the collaboration processing of the message, the server 10 can perform the collaboration processing of the message as long as permission of the administrator of the board can be obtained.

[Processing Procedures]

Figure 4:
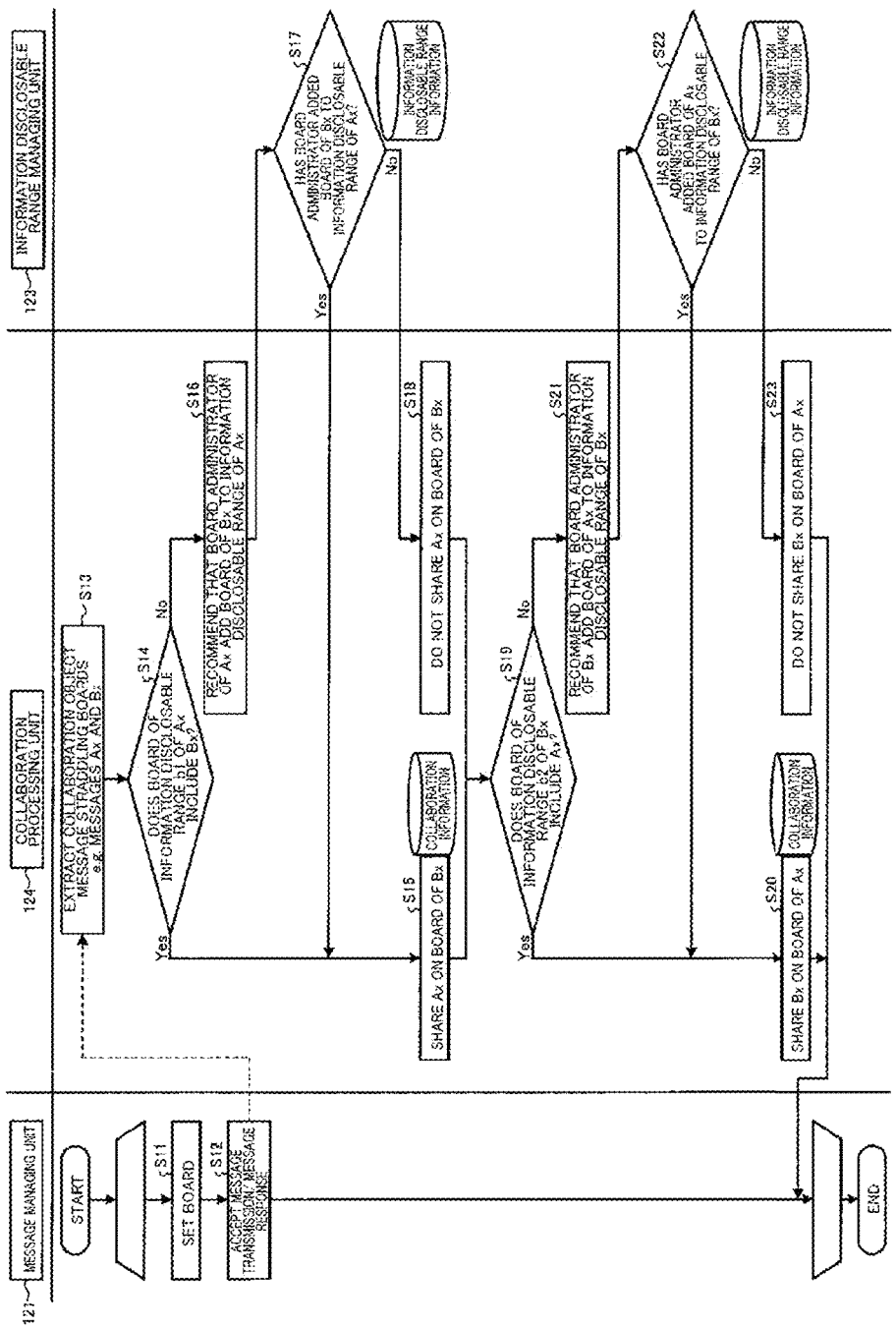
FIG. 4 is a sequence diagram showing an example of processing procedures of a server according to Second embodiment.

Next, an example of processing procedures of the server 10 according to Second embodiment will be described using FIG. 4. Since processing of S11 to S15 in FIG. 4 is similar to processing of S1 to S5 in FIG. 3, a description thereof will be omitted and a description of S16 and thereafter in FIG. 4 will be provided. In the following description, it is assumed that a notification by the collaboration processing unit 124 is performed by, for example, transmitting an email or a message to a prescribed client terminal 20.

In S14, when the collaboration processing unit 124 determines that Bx is not included in a board of the information disclosable range b1 of Ax (No in S14), the collaboration processing unit 124 recommends that the board administrator of Ax add a board of Bx to the information disclosable range of Ax (S16).

For example, when the collaboration processing unit 124 refers to basic information of the board A and identifies the board administrator of the board A to which Ax belongs, the collaboration processing unit 124 notifies a terminal (the client terminal 20) of the board administrator of a recommendation to add the board of Bx (the board B) to the information disclosable range of the board A.

After S16, the information disclosable range managing unit 123 determines whether or not the board administrator has added the board of Bx to the information disclosable range of Ax (S17). For example, the information disclosable range managing unit 123 determines whether or not an instruction to the effect that the board of Bx is to be added to the information disclosable range of the board A has been received from the client terminal 20 of the board administrator of the board A. In addition, when the information disclosable range managing unit 123 determines that the board administrator of the board A has added the board of Bx to the information disclosable range of Ax (Yes in S17), the information disclosable range managing unit 123 adds the board of Bx to the information disclosable range information of the board A in the information disclosable range information storage unit 136 and advances to S15. In addition, based on the information disclosable range information, the collaboration processing unit 124 creates collaboration information to the effect that Ax is to be shared on the board of Bx and stores the collaboration information in the collaboration information storage unit 137 (S15: share Ax on board of Bx). Subsequently, the collaboration processing unit 124 advances to S19.

On the other hand, when the information disclosable range managing unit 123 determines that the board administrator of the board A has not added the board of Bx to the information disclosable range of Ax (No in S17), the collaboration processing unit 124 does not share Ax on the board of Bx (S18). Subsequently, the collaboration processing unit 124 advances to S19.

In S19, in a similar manner to S7 in FIG. 3, the collaboration processing unit 124 refers to the information disclosable range information of the board B and determines whether or not Ax is included in a board of an information disclosable range b2 of Bx. In addition, when the collaboration processing unit 124 determines that Ax is not included in the board of the information disclosable range b2 of Bx (No in S19), the collaboration processing unit 124 recommends that the board administrator of Bx add a board of Ax to the information disclosable range of Bx (S21).

For example, when the collaboration processing unit 124 refers to basic information of a board and identifies the board administrator of the board B to which Bx belongs, the collaboration processing unit 124 notifies a terminal (the client terminal 20) of the board administrator of a recommendation to add the board (the board A) of Ax to the information disclosable range of the board B.

After S21, the information disclosable range managing unit 123 determines whether or not the board administrator has added the board of Ax to the information disclosable range of Bx (S22). For example, the information disclosable range managing unit 123 determines whether or not an instruction to the effect that the board of Ax is to be added to the information disclosable range of the board B has been received from the client terminal 20 of the board administrator of the board B. In addition, when the information disclosable range managing unit 123 determines that the board administrator of the board B has added the board of Ax to the information disclosable range of Bx (Yes in S22), the information disclosable range managing unit 123 adds the board of Ax to the information disclosable range information of the board B in the information disclosable range information storage unit 136 and advances to S20. Furthermore, based on the information disclosable range information, the collaboration processing unit 124 creates collaboration information to the effect that Bx is to be shared on the board of Ax and stores the collaboration information in the collaboration information storage unit 137 (S20: share Bx on board of Ax).

On the other hand, when the information disclosable range managing unit 123 determines that the board administrator of the board B has not added the board of Ax to the information disclosable range of Bx (No in S22), the collaboration processing unit 124 does not share Bx on the board of Ax (S23).

Since processing in S19 in a case where the collaboration processing unit 124 determines that Ax is to be included in the board of the information disclosable range b2 of Bx (Yes in S19) is similar to that of S8 in FIG. 3, a description thereof will be omitted.

Subsequently, the server 10 refers to collaboration information that is stored in the collaboration information storage unit 137 and discloses (shares) messages that are collaboration objects (for example, the messages Ax and Bx) so as to straddle boards.

With the server 10 according to Second embodiment described above, even when a board that is a collaboration destination does not belong to the information disclosable range of a board to which a message belongs in collaboration processing of the message, the server 10 can perform the collaboration processing of the message by obtaining permission of an administrator of the board.

It should be noted that, in S16 in FIG. 4, the board administrator of Ax may not have a right to view Bx. In such a case, the collaboration processing unit 124 may be configured not to display message contents of Bx during a recommendation to the board administrator of Ax. In a similar manner, since the board administrator of Bx may not have a right to view Ax in S21 in FIG. 4, in such a case, the collaboration processing unit 124 may be configured not to display message contents of Ax during a recommendation to the board administrator of Bx.

Alternatively, the server 10 according to Second embodiment may be configured to also confirm permission of collaboration (sharing) of a message that is a collaboration object with an issuer of the message prior to the collaboration of the message and not perform the collaboration of the message when the issuer does not give the permission. An embodiment in this case will be described as Third embodiment. Same components as the embodiments described above will be denoted using same reference signs and descriptions thereof will be omitted.

Third Embodiment

[Processing Procedures]

An example of processing procedures of the server 10 according to Third embodiment will be described using FIG. 5. Same components as the embodiments described above will be denoted using same reference signs and descriptions thereof will be omitted. Since processing of S31 to S33 and S38 in FIG. 5 is similar to processing of S11 to S14 and S16 in FIG. 4, a description thereof will be omitted and a description of S34 and thereafter in FIG. 5 will be provided.

Figure 5:
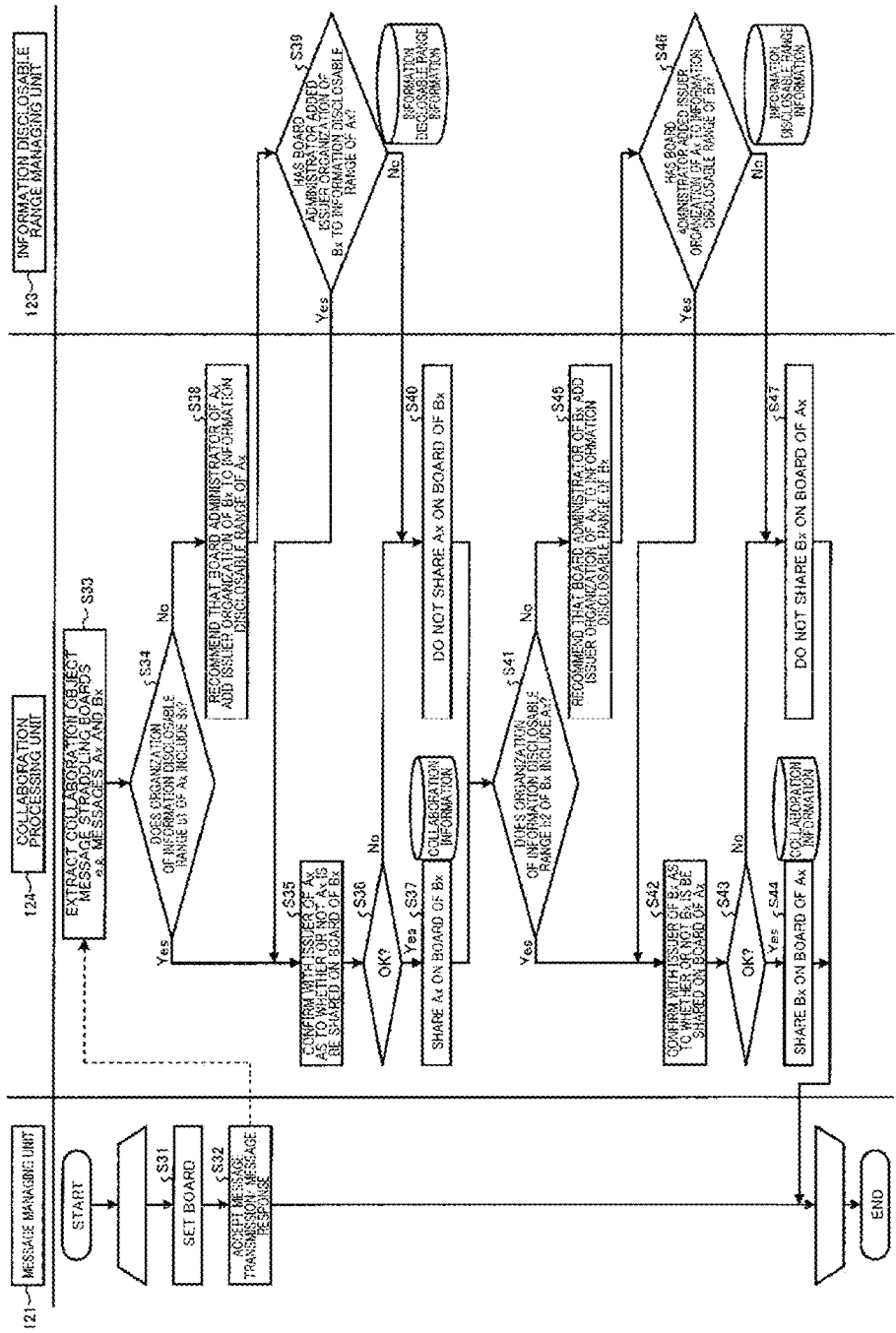
FIG. 5 is a sequence diagram showing an example of processing procedures of a server according to Third embodiment.

In S34 in FIG. 5, when the collaboration processing unit 124 determines that Bx (an issuer organization of Bx) is included in an organization of the information disclosable range b1 of Ax (Yes in S34), the collaboration processing unit 124 confirms with an issuer of Ax as to whether or not Ax is to be shared on a board of Bx (S35).

For example, the collaboration processing unit 124 refers to information stored in the message information storage unit 134 and the user information storage unit 131 and identifies the issuer of Ax. In addition, the collaboration processing unit 124 notifies the client terminal 20 of the issuer of Ax to confirm whether or not Ax may be shared on the board of Bx.

After S35, when a response to the effect that Ax may be shared on the board of Bx is obtained from the issuer of Ax (Yes in S36: OK?), the collaboration processing unit 124 shares Ax on the board of Bx (S37). For example, the collaboration processing unit 124 makes Ax only viewable by the issuer organization of Bx on the board of Bx. Subsequently, the collaboration processing unit 124 advances to S41.

On the other hand, when a response to the effect that Ax may be shared on the board of Bx is not obtained from the issuer of Ax (No in S36: OK?), the collaboration processing unit 124 does not share Ax on the board of Bx (S40). Subsequently, the collaboration processing unit 124 advances to S41.

In addition, when Bx is not included in the board of the information disclosable range b1 of Ax (No in S34) but the collaboration processing unit 124 recommends that the board administrator of Ax add the issuer organization of Bx to the information disclosable range of Ax (S38) and the information disclosable range managing unit 123 determines that the board administrator has added the issuer organization of Bx to the information disclosable range of Ax (Yes in S39), the collaboration processing unit 124 advances to S35 and confirms with the issuer of Ax as to whether or not Ax is to be shared on the board of Bx (S35). Subsequently, processing of S36 and thereafter is performed.

On the other hand, when the information disclosable range managing unit 123 determines that the board administrator has not added the issuer organization of Bx to the information disclosable range of Ax (No in S39), the collaboration processing unit 124 does not share Ax on the board of Bx in a similar manner to S18 in FIG. 4 (S40). Subsequently, the collaboration processing unit 124 advances to S41.

In S41, when the collaboration processing unit 124 determines that Ax (an issuer organization of Ax) is included in an organization of the information disclosable range b2 of Bx (Yes in S41), the collaboration processing unit 124 confirms with an issuer of Bx as to whether or not Bx is to be shared on a board of Ax (S42).

For example, the collaboration processing unit 124 refers to information stored in the message information storage unit 134 and the user information storage unit 131 and identifies the issuer of Bx. In addition, the collaboration processing unit 124 notifies the client terminal 20 of the issuer of Bx to confirm whether or not Bx may be shared on the board of Ax.

After S42, when a response to the effect that Bx may be shared on the board of Ax is obtained from the issuer of Bx (Yes in S43: OK?), the collaboration processing unit 124 shares Bx on the board of Ax (S44). For example, the collaboration processing unit 124 makes Bx only viewable by the issuer organization of Ax on the board of Ax.

On the other hand, when a response to the effect that Bx may be shared on the board of Ax is not obtained from the issuer of Bx (No in S43: OK?), the collaboration processing unit 124 does not share Bx on the board of Ax (S47).

In addition, when Ax (the issuer organization of Ax) is not included in the organization of the information disclosable range b2 of Bx (No in S41) but the collaboration processing unit 124 recommends that the board administrator of Bx add the issuer organization of Ax to the information disclosable range of Bx (S45) and the information disclosable range managing unit 123 determines that the board administrator has added the issuer organization of Ax to the information disclosable range of Bx (Yes in S46), the collaboration processing unit 124 also advances to S42 and confirms with the issuer of Bx as to whether or not Bx is to be shared on the board of Ax (S42). Subsequently, processing of S43 and thereafter is performed.

On the other hand, when the information disclosable range managing unit 123 determines that the board administrator does not add the issuer organization of Ax to the information disclosable range of Bx (No in S46), the collaboration processing unit 124 does not share Bx on the board of Ax (S47).

Subsequently, the server 10 refers to collaboration information that is stored in the collaboration information storage unit 137 and discloses (shares) messages that are collaboration objects (for example, the messages Ax and Bx) so as to straddle boards.

Accordingly, the server 10 can perform a collaboration of a message that is a collaboration object after obtaining permission to do so from the administrator of the board of the message and the issuer of the message.

Although the collaboration processing unit 124 determines whether or not the issuer organization of Bx is included in an organization of the information disclosable range b1 of Ax in S34 in FIG. 5, this procedure is not restrictive.

For example, in S34, the collaboration processing unit 124 may determine whether or not all organizations in the information sharing range of a board of Bx are included in organizations of the information disclosable range b1 of Ax. In this case, in S38, the collaboration processing unit 124 recommends that the board administrator of Ax add organizations in the information sharing range of the board of Bx that are lacking in the information disclosable range b1 of Ax and, in S39, branching takes place depending on whether or not the board administrator has added the recommended organizations. In this case, when the collaboration processing unit 124 determines that all of the organizations in the information sharing range of the board of Bx are included in the organizations of the information disclosable range b1 of Ax, in S37, the collaboration processing unit 124 shares Ax on the board of Bx. As a result, all of the organizations in the information sharing range of the board of Bx become capable of viewing Ax on the board of Bx.

In addition, for example, in S41, the collaboration processing unit 124 may similarly determine whether or not all organizations in the information sharing range of a board of Ax are included in organizations of the information disclosable range b2 of Bx. In this case, in S45, the collaboration processing unit 124 recommends that the board administrator of Bx add organizations in the information sharing range of the board of Ax that are lacking in the information disclosable range b2 of Bx and, in S46, branching takes place depending on whether or not the board administrator has added the recommended organizations. In this case, when the collaboration processing unit 124 determines that all of the organizations in the information sharing range of the board of Ax are included in the organizations of the information disclosable range b2 of Bx, in S44, the collaboration processing unit 124 shares Bx on the board of Ax. As a result, all of the organizations in the information sharing range of the board of Ax become capable of viewing Bx on the board of Ax.

It should be noted that, in S35 in FIG. 5, the issuer of Ax may not have a right to view Bx. In such a case, the collaboration processing unit 124 may be configured not to display message contents of Bx during a confirmation with the issuer of Ax. In a similar manner in S42 in FIG. 5, since the issuer of Bx may not have a right to view Ax, in such a case, the collaboration processing unit 124 may be configured not to display message contents of Ax during a confirmation with the issuer of Bx.

Alternatively, with the server 10 according to Third embodiment, for example, with respect to the messages Ax and Bx, when both sharing of the message Ax on the board B and sharing of the message Bx on the board A are both permitted, the messages Ax and Bx may be collaborated (shared) on each other's boards (the boards A and B). An embodiment in this case will be described as Fourth embodiment. Same components as the embodiments described above will be denoted using same reference signs and descriptions thereof will be omitted.

Fourth Embodiment

[Processing Procedures]

Figure 6:
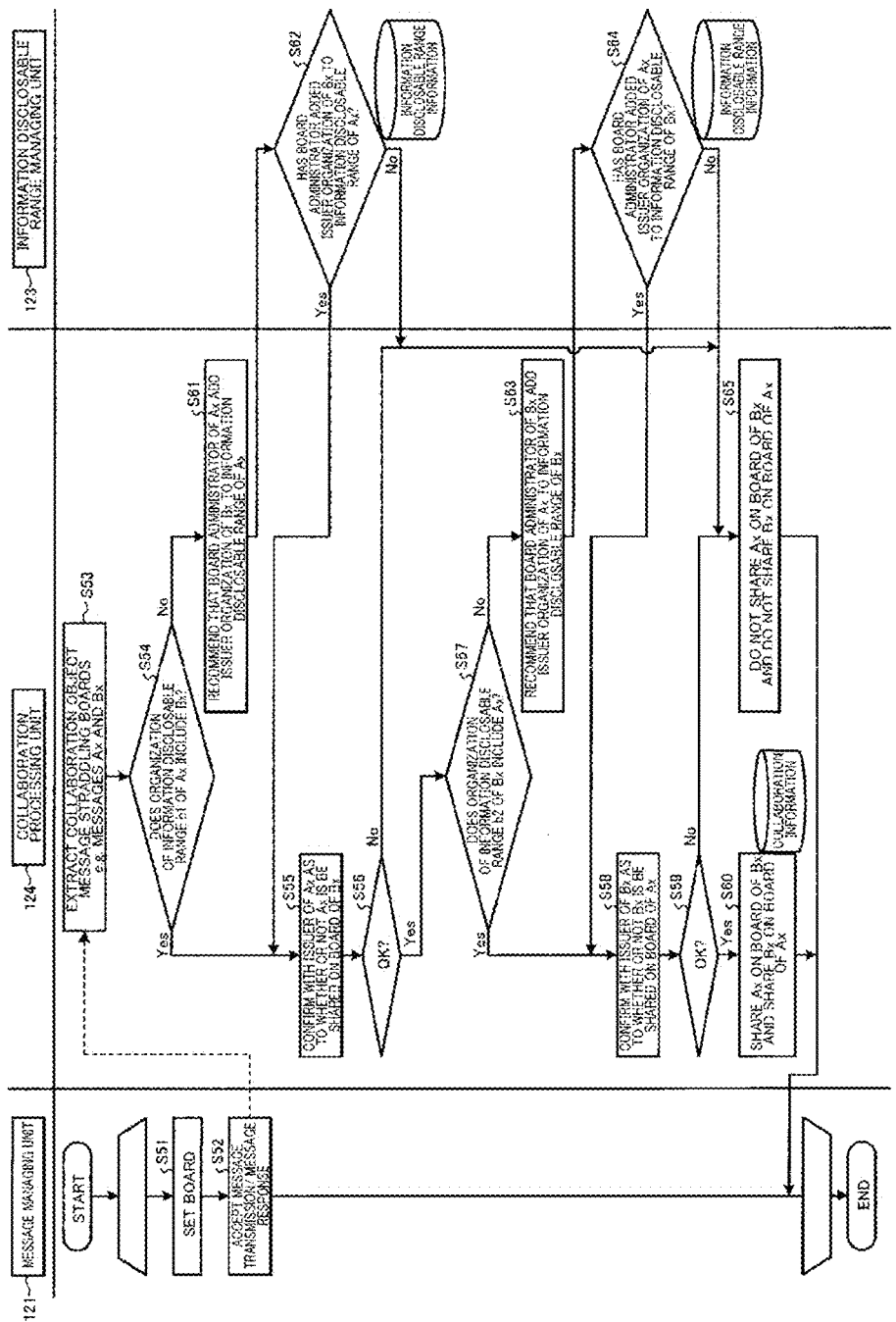
FIG. 6 is a sequence diagram showing an example of processing procedures of a server according to Fourth embodiment.

An example of processing procedures of the server 10 according to Fourth embodiment will be described using FIG. 6. Since processing of S51 to S55, S61, and S62 in FIG. 6 is similar to processing of S31 to S35, S38, and S39 in FIG. 5, a description thereof will be omitted. In addition, since processing of S57, S58, and S63 in FIG. 6 is similar to processing of S41, S42, and S45 in FIG. 5, a description thereof will be omitted.

After S55, in a case where a response to the effect that Ax may be shared on the board of Bx is obtained from the issuer of Ax (Yes in S56: OK?), when Ax is included in the board of the information disclosable range b2 of Bx (Yes in S57), the collaboration processing unit 124 confirms with the issuer of Bx as to whether or not Bx is to be shared on the board of Ax (S58). Subsequently, when a response to the effect that Bx may be shared on the board of Ax is obtained from the issuer of Bx (Yes in S59: OK?), the collaboration processing unit 124 shares Ax on the board of Bx and, at the same time, shares Bx on the board of Ax (S60). In other words, the collaboration processing unit 124 creates collaboration information to the effect that Ax is to be disclosed on the board B of Bx and collaboration information to the effect that Bx is to be disclosed on the board A of Ax, and stores the pieces of collaboration information in the collaboration information storage unit 137.

In S56, when a response to the effect that Ax may be shared on the board of Bx is not obtained from the issuer of Ax (No in S56), the collaboration processing unit 124 does not share Ax on the board of Bx and, at the same time, does not share Bx on the board of Ax (S65).

In addition, in S59, when a response to the effect that Bx may be shared on the board of Ax is not obtained from the issuer of Bx (No in S59: OK?), the collaboration processing unit 124 similarly does not share Ax on the board of Bx and, at the same time, does not share Bx on the board of Ax (S65).

Furthermore, in S62, when the information disclosable range managing unit 123 determines that the board administrator has not added the issuer organization of Bx to the information disclosable range of Ax (No in S62), the collaboration processing unit 124 similarly does not share Ax on the board of Bx and, at the same time, does not share Bx on the board of Ax (S65).

In addition, in S64, when the information disclosable range managing unit 123 determines that the board administrator has not added the issuer organization of Ax to the information disclosable range of Bx (No in S64), the collaboration processing unit 124 similarly does not share Ax on the board of Bx and, at the same time, does not share Bx on the board of Ax (S65).

In S64, when the information disclosable range managing unit 123 determines that the board administrator has added the issuer organization of Ax to the information disclosable range of Bx (Yes in S64), processing of S58 and thereafter is executed.

Accordingly, for example, with respect to the messages Ax and Bx, when both sharing of the message Ax on the board B and sharing of the message Bx on the board A are permitted, the server 10 enables the messages Ax and Bx to be collaborated (shared) on each other's boards (the boards A and B).

Alternatively, for example, when permission for sharing (a response to the effect that sharing is necessary) is obtained from a directly higher-level organization or the like of organizations to which issuers of the collaboration object messages Ax and Bx belong, the server 10 may enable the messages Ax and Bx to be collaborated (shared) on each other's boards (the boards A and B). An embodiment in this case will be described as Fifth embodiment. Same components as the embodiments described above will be denoted using same reference signs and descriptions thereof will be omitted.

Fifth Embodiment

[Processing Procedures]

Figure 7:
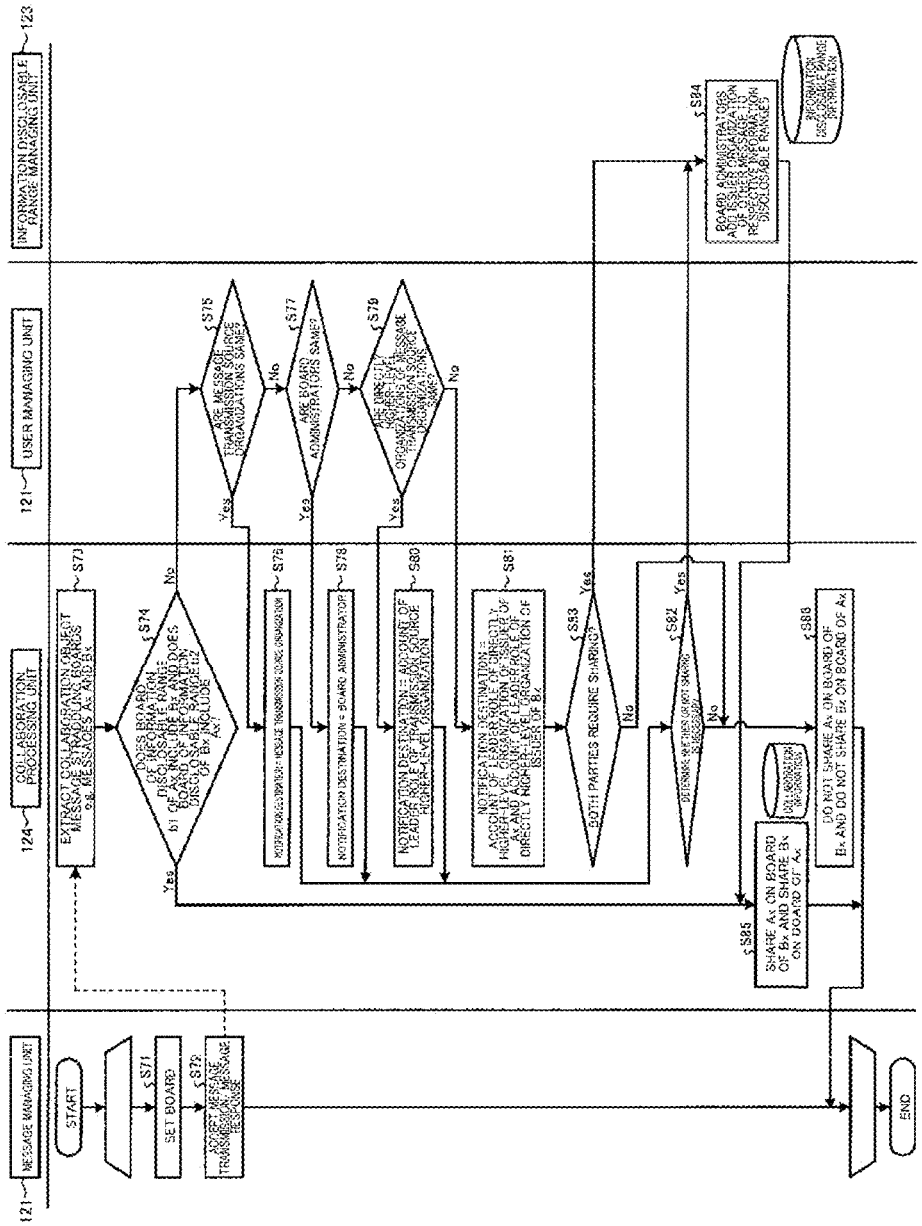
FIG. 7 is a sequence diagram showing an example of processing procedures of a server according to Fifth embodiment.

An example of processing procedures of the server 10 according to Fifth embodiment will be described using FIG. 7. Since processing of S71 to S73 in FIG. 7 is similar to processing of S51 to S53 in FIG. 6, a description thereof will be omitted and a description of S74 and thereafter in FIG. 7 will be provided.

In S74, the collaboration processing unit 124 refers to the information disclosable range information of the board A and the board B and determines whether or not Bx is included in a board of an information disclosable range b1 of Ax and, at the same time, determines whether or not Ax is included in a board of an information disclosable range b2 of Bx. For example, the collaboration processing unit 124 refers to the information disclosable range information of the board A and the board B and determines whether or not the board B is included in the information disclosable range b1 of the board A to which Ax belongs and, at the same time, determines whether or not the board A is included in a board of the information disclosable range b2 of the board B to which Bx belongs.

In addition, when the collaboration processing unit 124 determines that Bx is included in the board of the information disclosable range b1 of Ax and, at the same time, determines that Ax is included in the board of the information disclosable range b2 of Bx (Yes in S74), the collaboration processing unit 124 shares Ax on the board of Bx and, at the same time, shares Bx on the board of Ax in a similar manner to S60 in FIG. 6 (S85). In other words, the collaboration processing unit 124 creates collaboration information to the effect that Ax is to be disclosed on the board B of Bx and collaboration information to the effect that Bx is to be disclosed on the board A of Ax, and stores the pieces of collaboration information in the collaboration information storage unit 137.

On the other hand, when the collaboration processing unit 124 determines that Bx is not included in the board of the information disclosable range b1 of Ax or determines that Ax is not included in the board of the information disclosable range b2 of Bx (No in S74), the collaboration processing unit 124 executes processing of S75 and thereafter and confirms whether or not sharing (collaboration) of Ax and Bx is necessary with respect to a prescribed organization, an account of a leader role of a higher-level organization of the organization, or a board administrator.

First, the user managing unit 121 determines whether or not message transmission source organizations of Ax and Bx are the same (S75). For example, the user managing unit 121 refers to information in the message information storage unit 134 and the user information storage unit 131 and determines whether or not the respective message transmission source organizations (the organizations to which the issuers belong) of Ax and Bx are the same.

In this case, when the user managing unit 121 determines that the message transmission source organizations of Ax and Bx are the same (Yes in S75), the collaboration processing unit 124 performs a notification to the message transmission source organization of Ax and Bx to confirm whether or not sharing (collaboration) of Ax and Bx is necessary (S76: notification destination=message transmission source organization). Subsequently, the collaboration processing unit 124 advances to S82.

On the other hand, when the user managing unit 121 determines that the message transmission source organizations of Ax and Bx are not the same (No in S75), the user managing unit 121 determines whether or not board administrators of Ax and Bx are the same (S77). For example, the user managing unit 121 refers to information in the message information storage unit 134 and the board basic information storage unit 133 and determines whether or not the board administrator of the board A and the board administrator of the board B are the same.

In this case, when the user managing unit 121 determines that the board administrators of Ax and Bx are the same (Yes in S77), the collaboration processing unit 124 performs a notification to the board administrator of Ax and Bx to confirm whether or not sharing of Ax and Bx is necessary (S78: notification destination=board administrator). Subsequently, the collaboration processing unit 124 advances to S82.

On the other hand, when the user managing unit 121 determines that the board administrators of Ax and Bx are not the same (No in S77), the user managing unit 121 determines whether or not directly higher-level organizations of the message transmission source organizations of Ax and Bx are the same (S79). For example, the user managing unit 121 refers to information in the message information storage unit 134, the board basic information storage unit 133, the user information storage unit 131, and the role information storage unit 132, and determines whether or not the directly higher-level organizations of the message transmission source organizations of Ax and Bx are the same.

In this case, when the user managing unit 121 determines that the directly higher-level organizations of the message transmission source organizations of Ax and Bx are the same (Yes in S79), the collaboration processing unit 124 performs a notification to an account of a leader role of the directly higher-level organization of the message transmission source organizations of Ax and Bx to confirm whether or not sharing of Ax and Bx is necessary (S80: notification destination=account of leader role of directly higher-level organization of message transmission source organization). Subsequently, the collaboration processing unit 124 advances to S82.

In S82, when the collaboration processing unit 124 receives a response indicating that sharing is necessary (sharing is required) from the notification destination with respect to the notification to confirm whether or not sharing of Ax and Bx is necessary (S82: Yes in determination of whether or not sharing is necessary), the collaboration processing unit 124 advances to S84. In addition, when the information disclosable range managing unit 123 determines that the board administrators have added the issuer organization of the other message to their respective information disclosable ranges, the information disclosable range managing unit 123 adds the issuer organization of the other message to the information disclosable range information in the information disclosable range information storage unit 136 (S84).

For example, when the information disclosable range managing unit 123 determines that the board administrator of the board A has added the issuer organization of Bx to the information disclosable range of the board A and, at the same time, the board administrator of the board B has added the issuer organization of Ax to the information disclosable range of the board B, the information disclosable range managing unit 123 adds the issuer organization of Bx to the information disclosable range information of the board A and adds the issuer organization of Ax to the information disclosable range information of the board B. Subsequently, the processing advances to S85.

On the other hand, in S82, when the collaboration processing unit 124 does not receive a response indicating that sharing is necessary (sharing is required) with respect to the notification to confirm whether or not sharing of Ax and Bx is necessary (S82: No in determination of whether or not sharing is necessary), the collaboration processing unit 124 does not share Ax on the board of Bx and, at the same time, does not share Bx on the board of Ax (S86).

On the other hand, in S79, when the user managing unit 121 determines that the directly higher-level organizations of the message transmission source organizations of Ax and Bx are not the same (No in S79), the collaboration processing unit 124 performs a notification to an account of a leader role of the directly higher-level organization of the issuer of Ax to confirm whether or not sharing of Ax is necessary and performs a notification to an account of a leader role of the directly higher-level organization of the issuer of Bx to confirm whether or not sharing of Bx is necessary (S81: notification destination=account of leader role of directly higher-level organization of issuer of Ax and account of leader role of directly higher-level organization of issuer of Bx).

After S81, when the collaboration processing unit 124 obtains, with respect to the notifications performed in S81, responses indicating that sharing is necessary (sharing is required) from both parties (a person playing a leader role of the directly higher-level organization of the issuer of Ax and a person playing a leader role of the directly higher-level organization of the issuer of Bx) (S83: Yes with respect to both parties require sharing?), the collaboration processing unit 124 advances to S84. On the other hand, when the collaboration processing unit 124 does not obtain a response indicating that sharing is necessary from at least either one of the persons with respect to the notifications performed in S81 (S83: No with respect to both parties require sharing?), the collaboration processing unit 124 advances to S84.

Alternatively, in S83, when the collaboration processing unit 124 obtains a response indicating that sharing is necessary from one of the persons but does not obtain a response indicating that sharing is necessary from the other person with respect to the notifications performed in S81 (S83: No with respect to both parties require sharing?), the collaboration processing unit 124 may notify the other person that a response indicating that sharing is necessary has been obtained from the one person and may have the other person redetermine whether or not sharing is necessary. Subsequently, as a result of the redetermination, when the collaboration processing unit 124 receives a response indicating that sharing is necessary from the other person, the collaboration processing unit 124 may advance to S84.

Accordingly, when permission for sharing (a response to the effect that sharing is necessary) is obtained from a directly higher-level organization or the like of organizations to which issuers of the collaboration object messages Ax and Bx belong, the server 10 enables the messages Ax and Bx to be collaborated (shared) on each other's boards (the boards A and B).

OTHER EMBODIMENTS

Alternatively, the server 10 according to the respective embodiments described above may accept a response message with respect to a message that has been collaborated so as to straddle boards.

For example, as shown in FIG. 8, let us consider a case where a message A1 (from an organization A21 to an organization B21) of the board A and a message B1 (from an organization X21 to an organization Y21) of the board B are similar to each other and the messages A1 and B1 are collaborated so as to straddle the boards.

In this case, the server 10 can set the organization X21 as a destination of a response message with respect to the message B1 (from the organization X21 to the organization Y21) that is being shared on the board B. For example, as shown in FIG. 8, although the information sharing range of the board A is the organizations A21, B21, and C22, when transmitting a response message with respect to the message B1 (from the organization X21 to the organization Y21) on the board A, X21 that is not included in the information sharing range of the board A can be set as a destination.

In addition, at this point, when the server 10 accepts a response message with respect to a collaborated message (for example, the message B1 on the board A), the server 10 also associates the response message with the original message (the message B1 on the board B).

Accordingly, the server 10 enables even a response message with respect to a collaborated message (for example, the message B1 on the board A) to be viewed by an organization (for example, an organization in the information sharing range of the board B) that is participating in a board to which the collaborated message belongs. Accordingly, information can be shared more efficiently between organizations.

When displaying a message collaborated so as to straddle boards or a response message with respect to the message on a board, the server 10 may mask names of individuals, proper nouns, and the like. Accordingly, when a message is collaborated so as to straddle boards, the server 10 can prevent personal information and the like from becoming disclosed beyond the information sharing range on the board to which the message belongs.

While the server 10 according to the respective embodiments is configured to confirm with, when the information disclosable range of a board does not include a board to which a collaboration object message belongs or an organization of an issuer of the collaboration object message, the administrator of the board as to whether or not the information disclosable range may be expanded, and when the administrator of the board permits expansion of the information disclosable range, perform update processing for expanding the information disclosable range indicated by the information disclosable range information of the board, this is not restrictive. For example, when the administrator of the board permits expansion of the information disclosable range, instead of performing the update processing for expanding the information disclosable range indicated by the information disclosable range information of the board, the server 10 may permit the expansion of the information disclosable range of the board on an ad-hoc basis and perform collaboration processing of the collaboration object message.

[Program]

The server 10 described in the above embodiments may be implemented by installing a program that realizes functions of the server 10 on a desired information processing device (a computer). For example, by having the information processing device run the program described above that is provided as packaged software or online software, the information processing device can be caused to function as the server 10. The information processing device as described herein includes desktop or notebook personal computers. In addition thereto, the information processing device includes mobile communication terminals such as a smart phone, a mobile phone, and a PHS (Personal Handyphone System) as well as a PDA (Personal Digital Assistant) and the like. Alternatively, the server 10 may be mounted on a cloud server.

An example of a computer that executes the program (a management program) described above will be described using FIG. 9. As shown in FIG. 9, for example, a computer 1000 has a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM (Random Access Memory) 1012. For example, the ROM 1011 stores a boot program such as a BIOS (Basic Input Output System). The hard disk drive interface 1030 is connected to a hard disk drive 1090. The disk drive interface 1040 is connected to a disk drive 1100. For example, an attachable/detachable storage medium such as a magnetic disk or an optical disk is inserted into the disk drive 1100. For example, a mouse 1110 and a keyboard 1120 are connected to the serial port interface 1050. For example, a display 1130 is connected to the video adapter 1060.

In this case, for example, as shown in FIG. 9, the hard disk drive 1090 stores an OS 1091, an application program 1092, a program module 1093, and program data 1094. The various pieces of data and information described in the embodiments presented above are stored in, for example, the hard disk drive 1090 or the memory 1010.

In addition, the CPU 1020 loads the program module 1093 and the program data 1094 stored in the hard disk drive 1090 as necessary to the RAM 1012 and executes the respective procedures described above.

The program module 1093 and the program data 1094 related to the management program described above are not limited to being stored in the hard disk drive 1090 and, for example, the program module 1093 and the program data 1094 may be stored in an attachable/detachable storage medium and read by the CPU 1020 via the disk drive 1100 or the like. Alternatively, the program module 1093 and the program data 1094 related to the program described above may be stored in another computer that is connected via a network such as a LAN (Local Area Network) or a WAN (Wide Area Network) to be read by the CPU 1020 via the network interface 1070.

REFERENCE SIGNS LIST

10 Server (management device)
12 Control unit
13 Storage unit
20 Client terminal
121 User managing unit
122 Message managing unit
123 Information disclosable range managing unit
124 Collaboration processing unit
131 User information storage unit
132 Role information storage unit
133 Board basic information storage unit
134 Message information storage unit
135 Information sharing range information storage unit
136 Information disclosable range information storage unit

The invention claimed is:

1. A management device which manages a plurality of boards and which enables a message of the hoards to be shared by organizations in an information sharing range of the boards, the management device comprising:
circuitry configured to implement
a collaboration processing unit which,
when a similarity between a first message that belongs to a first board and a second message that belongs to a second board is equal to or greater than a prescribed value, said similarity being determined in accordance with a number of words in common between the first message and the second message, refers to information disclosable range information of the first board that indicates a board or an organization in a range where a message of the first board is disclosable beyond an information sharing range of the first board and discloses the first message on the second board when it is determined that the second board is included in the range where the first message is disclosable, and
when the information disclosable range information of the first board is referred to and a determination is made that an organization to which an issuer of the second message belongs is included in the range where the first message is disclosable, discloses the first message to the organization to which the issuer of the second message of the second board belongs.

2. The management device according to claim 1, wherein the collaboration processing unit transmits, when referring to the information disclosable range information of the first board and determining that a range in which a message of the first board is disclosable does not include the second board or does not include an organization to which an issuer of the second message belongs, a notification to confirm with a terminal of an administrator of the first board as to whether or not the first message may be disclosed to the second board or the organization to which the issuer of the second message belongs, and when a response to the effect that the first message may be disclosed to the second board is received from the terminal of the administrator of the first board as a response to the notification, discloses the first message on the second board, and when a response to the effect that the first message may be disclosed to the organization to which the issuer of the second message belongs is received from the terminal of the administrator of the first board as a response to the notification, discloses the first message to the organization to which the issuer of the second message belongs.

3. The management device according to claim 2, wherein the circuitry is further configured to implement an information disclosable range managing unit which, when receiving a response to the effect that the first message may be disclosed to the second board from the terminal of the administrator of the first board, performs update processing to add the second board to the range in which a message of the first board is disclosable in information disclosable range information of the first board and, when receiving a response to the effect that the first message may be disclosed to the organization to which the issuer of the second message belongs from the terminal of the administrator of the first board, performs update processing to add the organization to which the issuer of the second message belongs to the range in which a message of the first board is disclosable in the information disclosable range information, wherein the collaboration processing unit refers to the information disclosable range information of the first board after the update processing and determines whether or not the second board is included in the range in which a message of the first board is disclosable or determines whether or not the organization to which the issuer of the second message belongs is included in the range in which a message of the first board is disclosable.

4. A management method executed by a management device which manages a plurality of boards and which enables a message of the boards to be shared by organizations in an information sharing range of the boards, the management method comprising:
when a similarity between a first message that belongs to a first board and a second message that belongs to a second board is equal to or greater than a prescribed value, said similarity being determined in accordance with a number of words in common between the first message and the second message, referring to information disclosable range information of the first board that indicates a board or an organization in a range where a message of the first board is disclosable beyond an information sharing range of the first board and disclosing the first message on the second board when it is determined that the second board is included in the range where the first message is disclosable; and
when the information disclosable range information of the first board is referred to and a determination is made that an organization to which n issuer of the second message belongs is included in the range where the first message is disclosable, disclosing the first message to the organization to which the issuer of the second message of the second board belongs.

5. A non-transitory, computer-readable storage medium storing a management program for managing a plurality of boards and enabling a message of the boards to be shared by organizations in an information sharing range of the boards, the management program, when executed on a computer, causing the computer to execute the steps of:

when a similarity between a first message that belongs to a first board and a second message that belongs to a second board is equal to or greater than a prescribed value, said similarity being determined in accordance with a number of words in common between the first message and the second message, referring to information disclosable range information of the first board that indicates a board or an organization in a range where a message of the first board is disclosable beyond an information sharing range of the first board and disclosing the first message on the second board when it is determined that the second board is included in the range where the first message is disclosable; and when the information disclosable range information of the first board is referred to and a determination is made that an organization to which an issuer of the second message belongs is included in the range where the first message is disclosable, disclosing the first message to the organization to which the issuer of the second message of the second board belongs.

\* \* \* \* \*